United States Patent [19]
Louis et al.

[11] Patent Number: 6,104,981
[45] Date of Patent: Aug. 15, 2000

[54] METHOD OF ASSISTING DETECTION OF MAN-MADE STRUCTURES IN A DIGITAL ELEVATION MAP (DEM)

[75] Inventors: Christian Louis, Orsay; Yves Lechervy, Evry, both of France

[73] Assignee: Alcatel, Paris, France

[21] Appl. No.: 09/025,817

[22] Filed: Feb. 19, 1998

[30] Foreign Application Priority Data

Feb. 20, 1997 [FR] France .................................. 97 02011

[51] Int. Cl.$^7$ .................................................. G06F 19/00
[52] U.S. Cl. .......................................................... 702/5
[58] Field of Search ............................... 702/5; 382/113, 382/108, 260

[56] References Cited

U.S. PATENT DOCUMENTS 5,444,618  8/1995  Seki et al. ..................................... 702/5
5,839,090  11/1998  Zoraster ....................................... 702/5

OTHER PUBLICATIONS

Satoshi Suzuki t al, "Maris: Map Recognition Input System", Pattern Recognition, vol. 23, No. 8, Jan. 1, 1990, pp. 919–933.

G. Jismalm et al, Cell Planning Products and Services, Ericsson Review, vol. 67, No. 2, Jan. 1, 1990, pp. 84–91.

K. C. Cox et al, "Rapid Search for Spherical Objects in Aerial Photographs" Proceedings of the Conference on Computer Vision and Pattern Recognition, Ann Arbor, Jun. 5–9, 1988, Institute of Electrical and Electronics Engineers, pp. 905–910.

*Primary Examiner*—Donald E. McElheny, Jr.
*Attorney, Agent, or Firm*—Sughrue, Mion, Zinn, Macpeak & Seas, PLLC

[57] ABSTRACT

A method of detecting man-made structures in a digital representation of a terrain, wherein said representation is a digital elevation map, and wherein said method comprises the following steps:

computing isolines in said digital elevation map;
  filtering said isolines on the basis of a size criterion;
  computing extremum isolines from the isolines filtered during the preceding step; and
  determining said regions of interest. The invention is applicable to any process involving supervision of a geographical site (e.g. planning cellular telecommunications networks).

10 Claims, 4 Drawing Sheets

METHOD OF ASSISTING DETECTION OF MAN-MADE STRUCTURES IN A DIGITAL ELEVATION MAP (DEM)

The present invention relates to a method of assisting detection of man-made structures in a Digital Elevation Map (DEM).

BACKGROUND OF THE INVENTION

The problem of detecting man-made structures in a computerized representation (image, digital elevation map, etc.) occurs in numerous applications, e.g. in planning cellular radiocommunications networks.

Such a network, e.g. a GSM (Global System for Mobile communications) network includes a plurality of base stations distributed geographically. Each of the stations serves to offer radio coverage for a determined geographical zone referred to as a "cell".

The geographical zone that any given base station actually covers depends on the geographical environment, and in particular on the presence of man-made structures in that environment. Thus, in order to locate the base stations in optimum manner, i.e. so that a mobile station is always able to communicate with a base station, it is necessary to know the positions of such man-made structures.

Conventionally, such terrain analysis is performed on the basis of aerial photographs or satellite photographs, either manually or by means of detection assistance tools.

Such image processing tools make it possible to differentiate between a plurality of regions in an image by analyzing and classifying textures, certain regions containing, for example, a high density of buildings, and others having a low density.

But the drawbacks of such an approach quickly become apparent:

That method does not make it possible to isolate the buildings and can only show up zones. For application to cellular network planning, such an approach is inadequate.

In addition, the textures of the zones must be different enough for it to be possible to apply a classification criterion.

Finally, the method gives no indication about the heights of the buildings or their shapes.

OBJECTS AND SUMMARY OF THE INVENTION

An object of the invention is to provide a method mitigating the various inadequacies. More precisely, the method of the invention makes it possible to detect a region even if it contains only one man-made structure, and to determine the shape and optionally the height of a building detected in this way. Such regions are referred to below as Regions Of Interest (ROIs).

The method of the invention processes an input digital elevation map which is a three-dimensional representation of a terrain, and comprises the following steps:

computing isolines on the elevation map;

filtering said isolines on the basis of a size criterion (perimeter of the isoline, volume or area described by the isoline, height, etc.);

computing extremum isolines; and determining regions of interest that contain man-made structures.

BRIEF DESCRIPTION OF THE DRAWINGS

The various characteristics and advantages appear more clearly from the following description given with reference to the figures, in which.

MORE DETAILED DESCRIPTION

Figure 1:
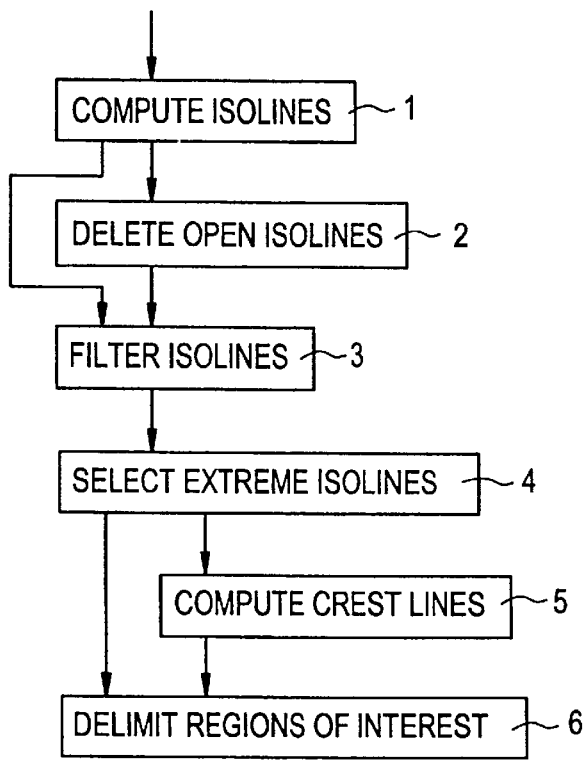
FIG. 1 is a flow chart showing the overall architecture of the method.

FIG. 1 is a flow chart showing the general structure of the method.

Figure 2:
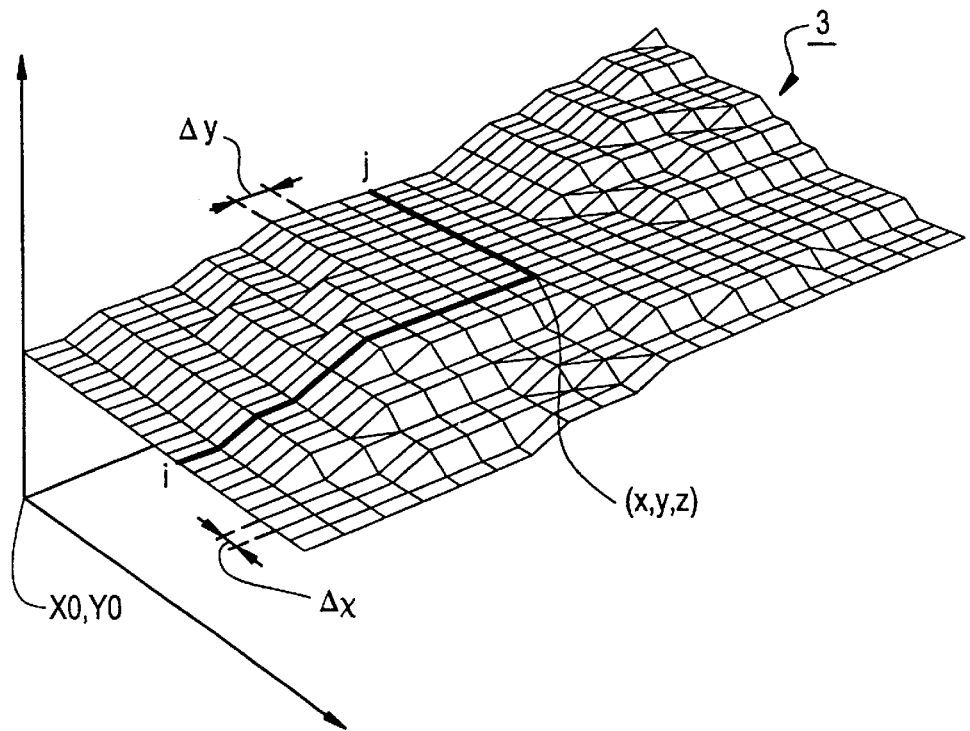
FIG. 2 shows an example of a Digital Elevation Map (DEM)

The data processed by the algorithm is constituted by digital elevation maps, an example of such a map being shown in FIG. 2.

A Digital Elevation Map (DEM) is a well known concept in three-dimensional (3D) imaging. It is a sampled matrix representation of a terrain, in which representation each co-ordinate point i,j is caused to correspond to a height $h(i,j)$.

The relationships between the co-ordinates i and j in the digital elevation map and the co-ordinates x, y, and z in the real 3D world are given by the following:

$x = X_o + i \times \Delta_x$ $y = Y_o + j \times \Delta_y$ $z = h(i,j)$ where $X_o$ and $Y_o$ represent the co-ordinates of the origin of the digital elevation map, and $\Delta_x$ and $\Delta_y$ represent the real distances between two samples in those two directions on the terrain.

Reference 1 represents the step of computing isolines on the digital elevation map.

An isoline is defined as being a closed line which interconnects points situated at the same altitude. In this application, it is similar to a contour line, but is not restricted to ground level.

Various methods may be used to compute the isolines on a digital elevation map. For example, one method that is both simple and effective is described in the work by Jean-Laurent Mallet entitled "Présentation d'un ensemble de méthodes et techniques de la cartographie automatique numérique" ["Presentation of a set of digital automatic cartography methods and techniques"] published in October 1974, "Les annales de l'Ecole Nationale Supérieure de Géologie Appliquée et de Prospection Miniére".

This step of the method of the invention thus consists in computing the isolines for a certain number of height values. The pitch, i.e. the height (h) interval between two consecutive isolines, is adjusted as a function of the heights of the looked-for structures and of the resolution of the digital elevation map.

Figure 3:
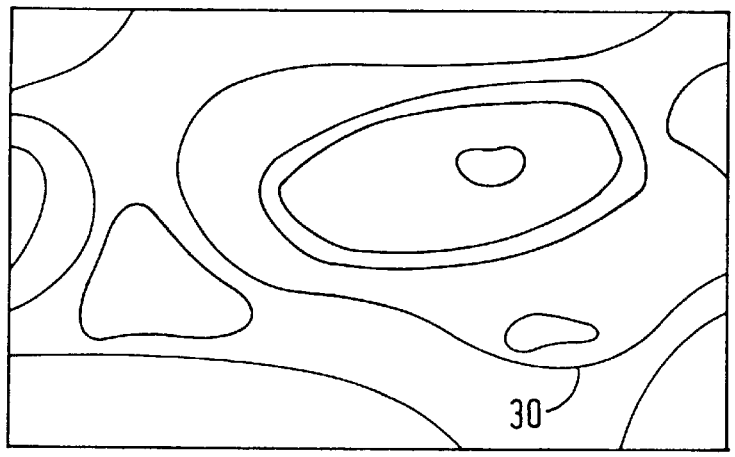
FIG. 3 shows the isolines computed by the first step of the method of the invention.

FIG. 3 shows the isolines computed on a digital elevation map by means of this step.

Reference 2 represents the step of the algorithm that consists in deleting open isolines from the set of isolines computed in the preceding step.

By the very definition of isolines, such open isolines should not exist. They result from the fact that the algorithm suffers from an edge effect: insofar as the image represents only a portion of a vaster world, certain features of relief are represented in part only. Naturally, the same applies for the corresponding isolines which appear incompletely on the processed image.

Naturally, this step is not essential, but it may be appropriate in certain cases not to process isolines for which only a portion of the information is available.

Figure 4:
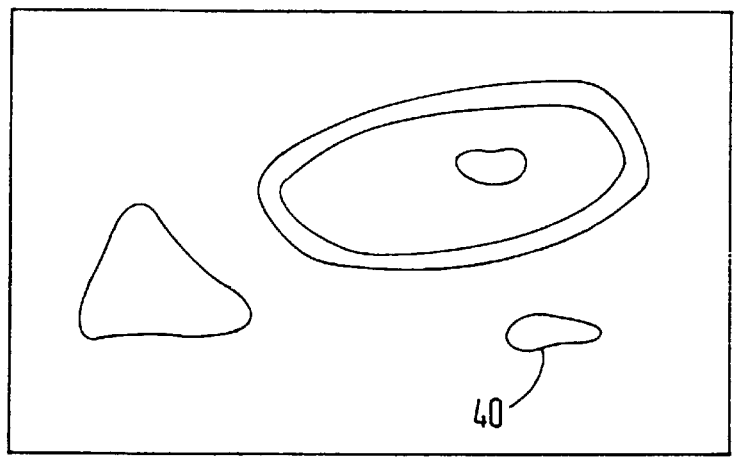
FIG. 4 shows the result after the open isolines have been deleted.

FIG. 4 shows the isolines remaining after this step. It can be observed that isoline 30 shown in FIG. 3 has been deleted.

Reference 3 in FIG. 1 represents the step of the algorithm that consists in filtering the isolines on the basis of a size criterion. This criterion may be the length of the isoline in question, the area or the volume that it describes, its height, etc.

The criterion chosen for the filtering depends on the characterization given to a man-made structure.

If a man-made structure is characterized as being a structure occupying a limited ground area, a criterion of the type "isoline perimeter" or "described area" can be sufficient.

If the characterization is more demanding and it is assumed that a man-made structure must have a minimum height and/or a maximum height, a criterion of the type height or volume described by the isoline can be more appropriate.

In addition, it is possible to combine a plurality of criteria, and to filter on the basis both of volume and of height, for example.

In any event, any type of size criterion may be used as a function of the application of the method, and the scope of the invention can in no way be limited to a particular criterion.

Figure 5:
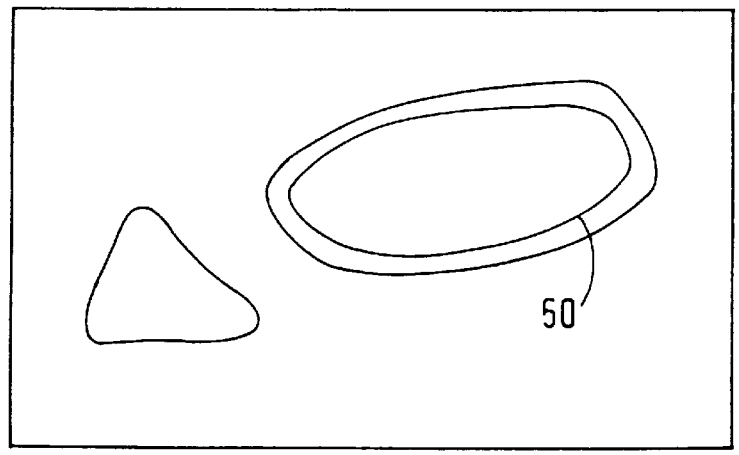
FIG. 5 shows the result of the step of the algorithm that consists in applying filtering to the sizes of the isolines.

FIG. 5 shows a result of this step as applied to the isolines resulting from the preceding step. This result is given merely by way of example because it depends on the chosen criterion and on the threshold relative to which the filtering is performed. In this example, it can be observed that isoline 40 shown in the preceding figure has disappeared because it does not correspond to the criteria. It can be supposed, for example, that it represented a volume that was too small to characterize a human structure.

Reference 4 represents the step consisting in selecting the extremum isolines only from the set of previously computed and filtered isolines.

A maximum isoline is an isoline whose projection on a horizontal plane (i.e. at constant height h) is not included in the projection of another isoline.

Below, no distinction is made between an isoline and the projection of the isoline on a horizontal plane. For example, it is said that an isoline $I_1$ lies within another isoline $I_2$ when the projection of isoline $I_1$ on a horizontal plane is inside the projection of isoline $I_2$ on the same horizontal plane.

Looking for maximum isolines in a set of isolines involves comparing the isolines in pairs, and in testing whether or not one isoline is included in the other.

It should also be noted that the number of configurations between two isolines is limited to two:

either one of the isolines lies within the other;

or else they are disjoint.

By the very definitions of an isoline and of a digital elevation map, it is impossible for the two isolines to intersect each other.

The problem is then reduced to determining whether or not an isoline $I_1$ is included in an isoline $I_2$. One method for performing this test in practice is to choose an arbitrary point on isoline $I_1$ and to follow an arbitrary half line from said point counting the number of times that the other isoline $I_2$ is intersected.

If this number is even (or zero), $I_1$ is not included in $I_2$. Otherwise, $I_1$ is included in $I_2$.

Figure 8:
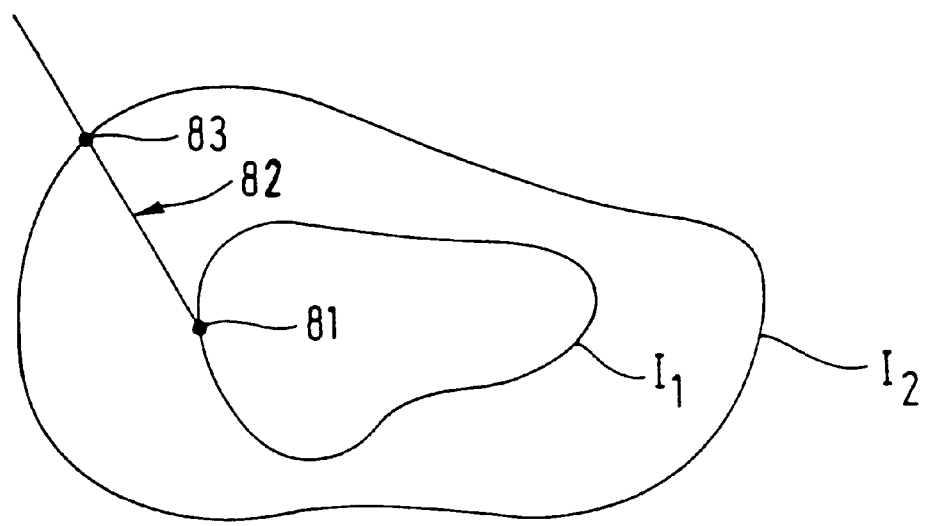
FIGS. 8 and 9 show the principle of determining the positions of two isolines relative to each other.
Figure 9:
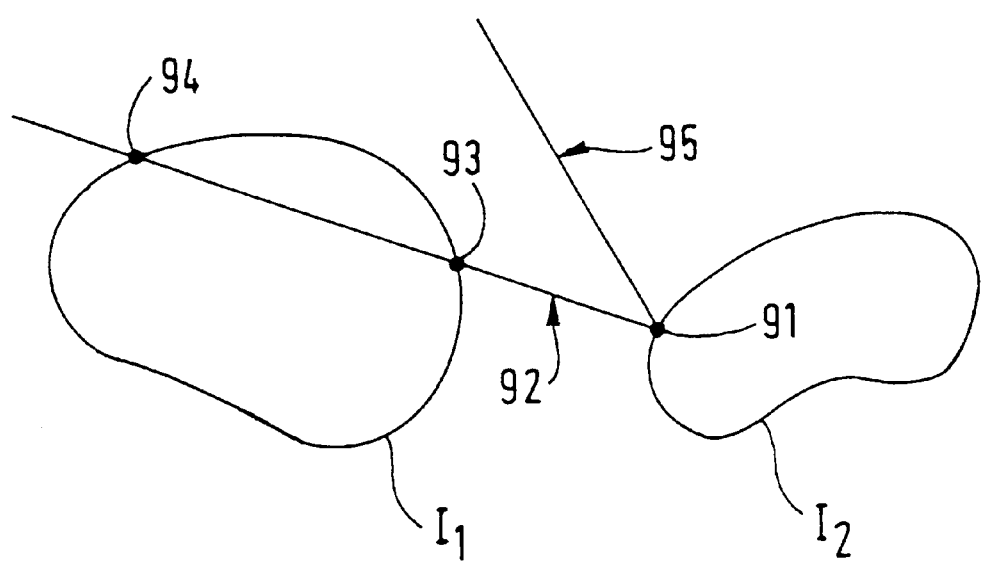

FIGS. 8 and 9 show the two configurations in which the two isolines $I_1$ and $I_2$ can be disposed.

In FIG. 8, isoline $I_1$ is included in isoline $I_2$. A point 81 is chosen randomly on isoline $I_1$. A half line 82 is drawn from this point in a direction that is also chosen randomly. This half line 82 intersects isoline $I_2$ at a point 83, and it is deduced from this that isoline $I_1$ is included in isoline $I_2$.

FIG. 9 shows the second possible configuration. A point 91 is chosen randomly on isoline $I_2$. A half line 92 is drawn from this point in a random direction. It intersects isoline $I_1$ at two points 93 and 94, and it is thus deduced that isoline $I_2$ is not included in isoline $I_1$.

Reference 95 indicates another possibility for the choice of half line. This half line does not intersect isoline $I_1$, and it is likewise deduced that isoline $I_2$ is not included in isoline $I_1$.

The isolines that result from this step can be interpreted as delimiting regions of interest.

Figure 6:
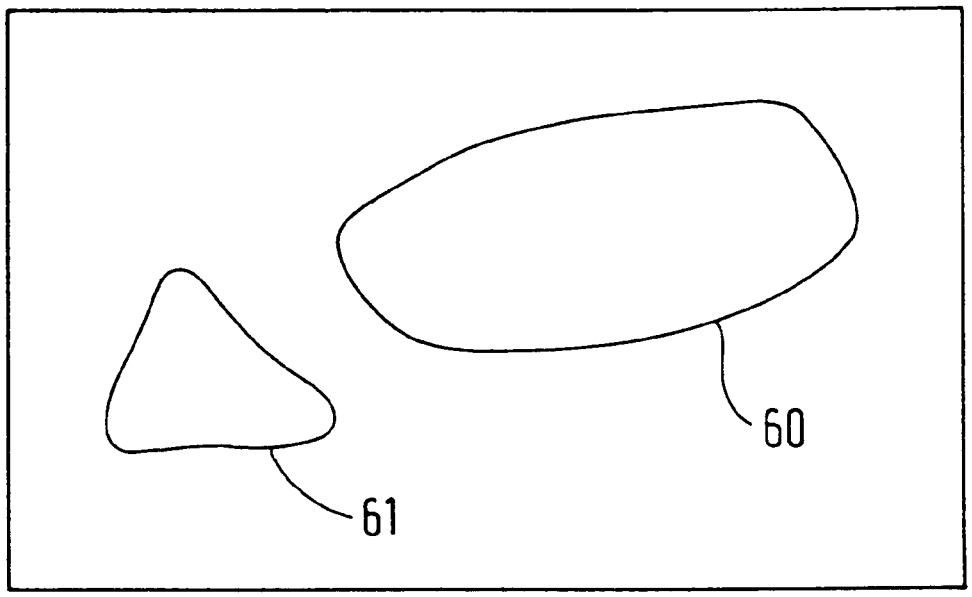
FIG. 6 shows the result of the step of the method that consists in selecting the extremum isolines only.

Thus, in FIG. 6 isoline 50 that is present in the preceding figure has disappeared because it was included within isoline 60. The latter isoline can be interpreted as delimiting a man-made structure, as can isoline 61.

However, at this stage, certain natural configurations can give rise to false positive detection. For example, a hill or a wood can be detected as being a potential man-made structure if it corresponds to the characterization criteria of step 2 of the method, because these criteria relate to size only.

Such false positives may be problematic in certain cases. It is then possible to add an additional step to the method that consists in computing the ridge lines contained in each isoline, and in selecting only those isolines in which the total length of the ridge lines is greater than a certain threshold.

Figure 7:
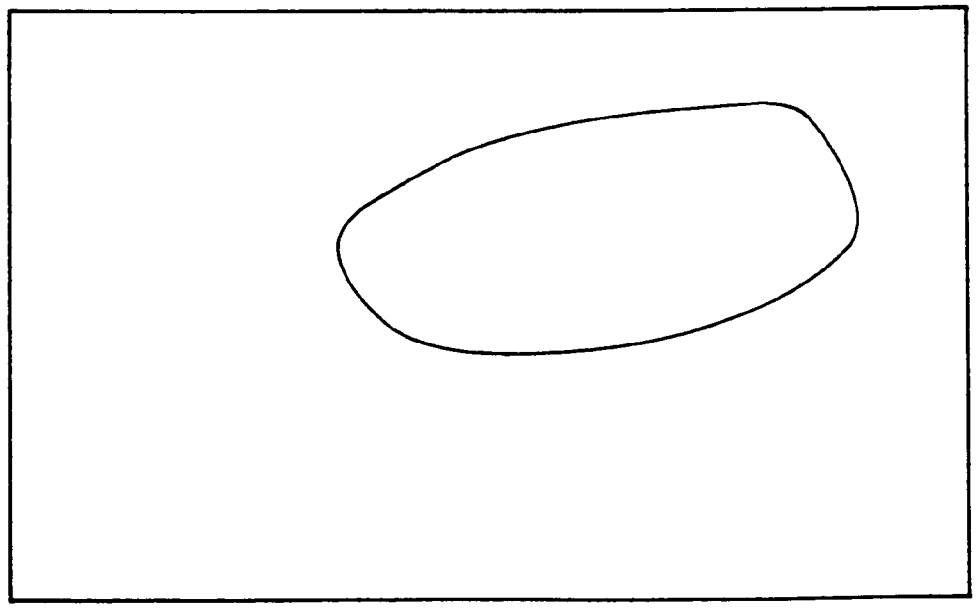
FIG. 7 shows the result of an optional step that consists in performing filtering on the total length of the ridge lines contained in each of the isolines, and in keeping only those isolines for which the length is greater than a certain threshold.

FIG. 7 shows the result of such as step. Isoline 61 has disappeared because the portion of digital elevation map that it contained did not have enough ridge lines.

It should however be noted that, with such a step, there can be problems of false negative detection of buildings that do not have ridge lines, e.g. such as a spherical building. It must thus be understood that this step is an optional step added as a function of the specific needs of particular application.

It should be noted that the expression "ridge line" is to be understood in its widest sense as is commonly the case in this technical field. This concept must cover "genuine" ridge lines (relief maxima) and also troughs (relief minima).

Computing ridge lines is a difficult but conventional problem in three-dimensional imaging. The reader may refer to numerous documents describing such a method including "The Marching Lines Algorithm: new results and proofs" by Jean-Philippe Thirion and Alexis Gourdon, "Rapport de recherche de l'INRIA (Institut National de la Recherche en Informatique et Automatique)" No. 1881, published in April 1993, or the work "Vision par ordinateur" ["computer vision"] written by Olivier Monga and Radu Horaud, "Traité des nouvelles technologies, série informatique" published by Hermés, or else "Crest lines extraction in volume 3D medical images: a multi-scale approach" by Olivier Monga, Richard Lengagne, and Rachid Deriche, "Rapport de recherche INRIA", No. 2338, published in July 1994.

Reference 6 of the algorithm consists in delimiting regions of interest, e.g. volume regions of interest.

The isolines resulting from the preceding step delimit regions of interest using the i and j coordinates of the digital elevation map. But it is possible to delimit the regions of interest in the third dimension by computing the maximum height of the points contained in the isoline.

The region of interest is then a cylinder whose cross-section is the isoline and which is truncated by two horizontal planes; the level of the top plane being equal to the maximum height, and the level of the bottom plane being equal to the height of the isoline.

Naturally, this step is optional. Its presence depends on the application that is to be made of the method, and on any algorithm steps that are to be added on after it.

What is claimed is:

1. A method of detecting regions of interest containing man-made structures in a terrain representation, wherein said terrain representation is a digital elevation map, and wherein said method comprises:

providing information representing the digital elevation map and information representing a size criterion;

using a computer to compute isolines in said provided digital elevation map;

filtering said computed isolines on the basis of the provided size criterion;

computing extremum isolines from the filtered isolines; and isolating said regions of interest containing man-made structures from regions delimited by the computed extremum isolines.

2. A method according to claim 1, wherein, after computing said extremum isolines, said method includes:

inputting a threshold value;

computing a total length of ridge lines contained in each of said extremum isolines; and filtering said extremum isolines as a function of a comparison between said computed total length of ridge lines and said inputted threshold value.

3. A method according to claim 1, wherein each region of interest is delimited in three dimensions:

by an isoline resulting from the computed extremum isolines;

by the horizontal plane containing said extremum isoline; and by the horizontal plane containing the point of maximum height contained in said isoline.

4. A method according to claim 1, wherein computing the isolines is immediately followed by deleting the open isolines from said isolines.

5. A method according to claim 2, wherein each region of interest is delimited in three dimensions:

by an isoline resulting from the filtered extremum isolines;

by the horizontal plane containing said extremum isoline; and by the horizontal plane containing the point of maximum height contained in said isoline.

6. A method of optimizing locations of base stations for cellular radiocommunications networks involving detecting regions of interest containing man-made structures in a terrain representation, wherein said terrain representation is a digital elevation map, and wherein said method comprises:

providing information representing the digital elevation map and information representing a size criterion;

using a computer to compute isolines in said provided digital elevation map;

filtering said computed isolines on the basis of the provided size criterion;

computing extremum isolines from the filtered isolines; and isolating said regions of interest containing man-made structures from regions delimited by the computed extremum isolines.

7. A method according to claim 6, wherein, after computing said extremum isolines, said method includes:

inputting a threshold value;

computing a total length of ridge lines contained in each of said extremum isolines; and filtering said extremum isolines as a function of a comparison between said computed total length of ridge lines and said inputted threshold value.

8. A method according to claim 6, wherein each region of interest is delimited in three dimensions:

by an isoline resulting from the computed extremum isolines;

by the horizontal plane containing said extremum isoline; and by the horizontal plane containing the point of maximum height contained in said isoline.

9. A method according to claim 6, wherein said computing the isolines is immediately followed by deleting the open isolines from said isolines.

10. A method according to claim 7, wherein each region of interest is delimited in three dimensions:

by an isoline resulting from the filtered extremum isolines;

by the horizontal plane containing said extremum isoline; and by the horizontal plane containing the point of maximum height contained in said isoline.

* * * * *